United States Patent
Rivot

(10) Patent No.: US 8,387,440 B2
(45) Date of Patent: Mar. 5, 2013

(54) METHOD FOR DETECTING A FUEL LEAKAGE IN AN AIRCRAFT ENGINE AND SYSTEM FOR CARRYING OUT SAID METHOD

(75) Inventor: Jean-Luc Rivot, La Salvetat Saint Gilles (FR)

(73) Assignee: Airbus Operations SAS, Toulouse (FR)

( * ) Notice: Subject to any disclaimer, the term of this patent is extended or adjusted under 35 U.S.C. 154(b) by 637 days.

(21) Appl. No.: 11/993,368

(22) PCT Filed: Jun. 20, 2006

(86) PCT No.: PCT/FR2006/001467
§ 371 (c)(1), (2), (4) Date: May 18, 2010

(87) PCT Pub. No.: WO2006/136736
PCT Pub. Date: Dec. 28, 2006

(65) Prior Publication Data
US 2010/0288883 A1    Nov. 18, 2010

(30) Foreign Application Priority Data
Jun. 21, 2005    (FR) .................................. 05 51696

(51) Int. Cl.
*G01M 3/04* (2006.01)
(52) U.S. Cl. .......................................................... 73/40
(58) Field of Classification Search ................. 73/40
See application file for complete search history.

(56) References Cited

U.S. PATENT DOCUMENTS
5,297,423 A    3/1994    Keating et al.
8,074,627 B2 *  12/2011    Siddiqui ................. 123/520

FOREIGN PATENT DOCUMENTS
JP    7286930 A    10/1995
JP    2003303640 A    10/2003
RU    2240263 C1    11/2004

OTHER PUBLICATIONS

William Trant: "Fuel Leaks" [online] Oct. 30, 2004, XP002371999, URL:http://web.archive.org/web/20041030184925/http://www.pilotosdeiberia.com/areatec/airbus_sfo/13fuel_leak.htm Mar. 14, 2006.
Bureau d'Enquetes et d'Analyses pour la Securite de l'Aviation Civile: "Incident survenu le 25 aout 1997 entre Paris et Lorient a l'A320 immatricule F-GHQH exploite par Air France", [online] Oct. 10, 2004 XP 002371998, URL: http://web.archive.org/web/20041010081535/http://bea-fr.org/docspa/1997/f-qh970824/htm/f-qh970824.html, Mar. 14, 2005.
Database WPI Week 05, Derwent Publication Ltd., London, GB; AN 2005-045268 XP002372001, "Method for notification of crew about fuel leak on aircraft during flight".

* cited by examiner

*Primary Examiner* — Hezron E Williams
*Assistant Examiner* — Rodney T Frank
(74) *Attorney, Agent, or Firm* — Perman & Green, LLP

(57) ABSTRACT

A method for detecting and localizing a fuel leakage in the engine of a multi-engine aircraft consisting in determining a fuel consumption for each aircraft engine, in comparing the consumption of each engine with the other aircraft engines, in determining the engine exhibiting the greater fuel consumption ratio, in determining the excess consumption ratio of the aforementioned engine with respect to the other engines, in checking whether the excessive consumption is caused by a leakage and in triggering an alarm if the step is checked. A system for detecting and localizing a fuel leakage in the engine of a multi-engine aircraft including an airborne computer for carrying out the aforementioned method is also disclosed.

19 Claims, 3 Drawing Sheets

METHOD FOR DETECTING A FUEL LEAKAGE IN AN AIRCRAFT ENGINE AND SYSTEM FOR CARRYING OUT SAID METHOD

CROSS-REFERENCE TO RELATED APPLICATIONS

This application is the National Stage of International Application No. PCT/FR2006/001467 International Filing Date, 20 Jun. 2006, which designated the United States of America, and which International Application was published under PCT Article 21 (s) as WO Publication No. WO 2006/136736 A2 and which claims priority from, and the benefit of, French Application No. 200551696 filed on 21 Jun. 2005, the disclosures of which are incorporated herein by reference in their entireties.

The aspects of the disclosed embodiments relate to a method for the detection and location of a fuel leak in an aircraft engine. This method can be used to detect the presence of a leak in one of the engines of an aircraft of a multi-engine type and determine the engine affected by this leak. The aspects of the disclosed embodiments also relate to a system to implement this method.

The aspects of the disclosed embodiments can be applied in aeronautics and especially in the detection of fuel leakage in an aircraft.

BACKGROUND

In aeronautics, it is important to be able to determine the existence of a fuel leak in the fuel supply circuit of the engines. The presence of an undetected fuel leak may cause problems for the flight plan of the aircraft, especially when the aircraft is flying in a zone distant from any diversion airport. To resolve this problem, most aircraft are equipped with an automatic fuel leak detection system. This system has gauges, each situated in a fuel tank of the aircraft and enabling the measurement at all times of the quantity of fuel on board. The system also comprises a flowmeter for each engine by which it is possible to know the flow rate of the fuel entering the engine and, from this information, deduce the quantity of fuel consumed by each engine. A comparison of a first value of consumption computed from the variation in the quantity of fuel on board since the beginning of the flight (given by the gauges of the aircraft) with the second consumption value computed from engine flowmeters from the beginning of the flight (the sum of all the engines) enables detection of the presence of a fuel leak. In other words, this system determines the difference between the first consumption value and the second consumption value. This difference should be zero. If this difference is not zero, it means that there is a fuel leak on board the aircraft.

However, this system can be used to determine a leak in the fuel supply system, solely upstream to the flowmeter, i.e. between the fuel tanks and the flowmeters of the engines. It therefore cannot be used to determine a leak for the rest of the piping systems situated downstream from the flowmeter.

Furthermore, this system enables the detection solely of the presence of a leak. It cannot be used to locate the leak. The locating of the leak is done sequentially by an operational procedure in flight. It is done by carrying out a part-by-part isolation of the aircraft fuel supply circuit.

SUMMARY

The disclosed embodiment are aimed precisely at overcoming the drawbacks of the techniques explained here above, i.e. at making it possible to detect a leak downstream from the flowmeter and identify the leaking engine. To this end, the disclosed embodiments propose a method to detect a fuel leak in an engine of a multi-engine type aircraft, for example a four-jet-engine aircraft. This method is based on a comparison of the fuel consumption of the different engines of the aircraft and on the consideration that the engine having the greatest fuel consumption is liable to show a leak. A coefficient is then determined in order to find out the proportion between the highest fuel consumption and an average fuel consumption of the other engines. When this coefficient reaches a predetermined value, it is considered that there is a leak. The engine having the leak is then determined as being the one with the greatest fuel consumption.

The fuel supply to this engine can then be cut off so as to limit the consequences of this leak.

More specifically, the disclosed embodiments relate to a method for the detection and locating of a fuel leak in an engine of an aircraft of the multi-engine type, characterized in that it comprises the operations of:

(a) determining a fuel consumption for each engine of the aircraft,
(b) comparing the consumption of each engine with the consumption of the other engines of the aircraft,
(c) detecting the engine having the greatest fuel consumption,
(d) determining a consumption surplus ratio of this engine relative to the other engines,
(e) verifying whether the surplus consumption comes from a leak, and
(f) if the step (e) is verified, triggering an alarm.

The disclosed embodiments may also comprise one or more of the following characteristics:
the fuel consumption for each engine is a quantity of fuel used in a first predefined time interval.
the first time interval is a sliding interval.
the fuel consumption is the fuel flow rate for each engine.
the operation of checking the consumption surplus consists in comparing the value of the surplus ratio with a predefined threshold value of the surplus ratio, and in confirming whether the value of the surplus ratio is maintained during a second predefined time interval,
the second time interval develops inversely proportionally to the value of the surplus ratio,
the operations (a) to (e) are performed simultaneously for a quantity of fuel used during the first time interval and for a fuel flow rate.
the operation (f) is triggered if the consumption surplus is detected either through the quantity of fuel or through the fuel flow rate.
the threshold value of the ratio for the fuel flow rate is greater than the threshold value of the ratio for the quantity of fuel.
it comprises an operation to locate the leak with a determining of the engine affected by the leak,
the alarm is triggered only if certain criteria pertaining to the flight conditions are fulfilled.
the operations (a) and (b) after performed only if the engines work at the same speed (first criterion).
the criterion is that the aircraft flies at a minimum altitude (second criterion).
the criterion is that the engines work above a minimum speed (third criterion). The minimum speed is the speed below which the flow rate varies excessively, thus making the detection non-representative. The detection is then disabled.

The disclosed embodiments also relate to a system of detection and location of a fuel leak in an engine of a multi-engine type aircraft, characterized in that the system implements the method described here above.

The system may comprise one or more of the following characteristics:
- it is installed in an aircraft computer and connected, for each engine, to an engine computer in order to receive data on the conditions of operation of the aircraft and of each engine,
- the aircraft computer comprises logic circuits capable of processing data received from the engine computers and from the aircraft computer.
- the system comprises a verification circuit for checking flight conditions, at least one circuit for the detection of the consumption surplus ratio and one circuit for triggering an alarm.

The disclosed embodiments also relate to an aircraft comprising a system as described here above.

DETAILED DESCRIPTION

The disclosed embodiments propose a method and a system to detect the presence of a leak in an aircraft engine and locate this leak. The system may be installed in the computer of a multi-engine aircraft, i.e. an aircraft comprising several engines, for example four engines. This system implements the method of the disclosed embodiments which shall be described through the description of the circuits forming the system of the disclosed embodiments.

The detection and location system of the disclosed embodiments comprises several electronic circuits connected to one another and receiving data from each engine computer, or FADEC, as well as other computers of the aircraft. These electronic circuits provide for the processing of this data to determine the fuel consumption of each engine of the aircraft and from this to deduce the existence of a leak, if any, in one of the engines.

Figure 1:
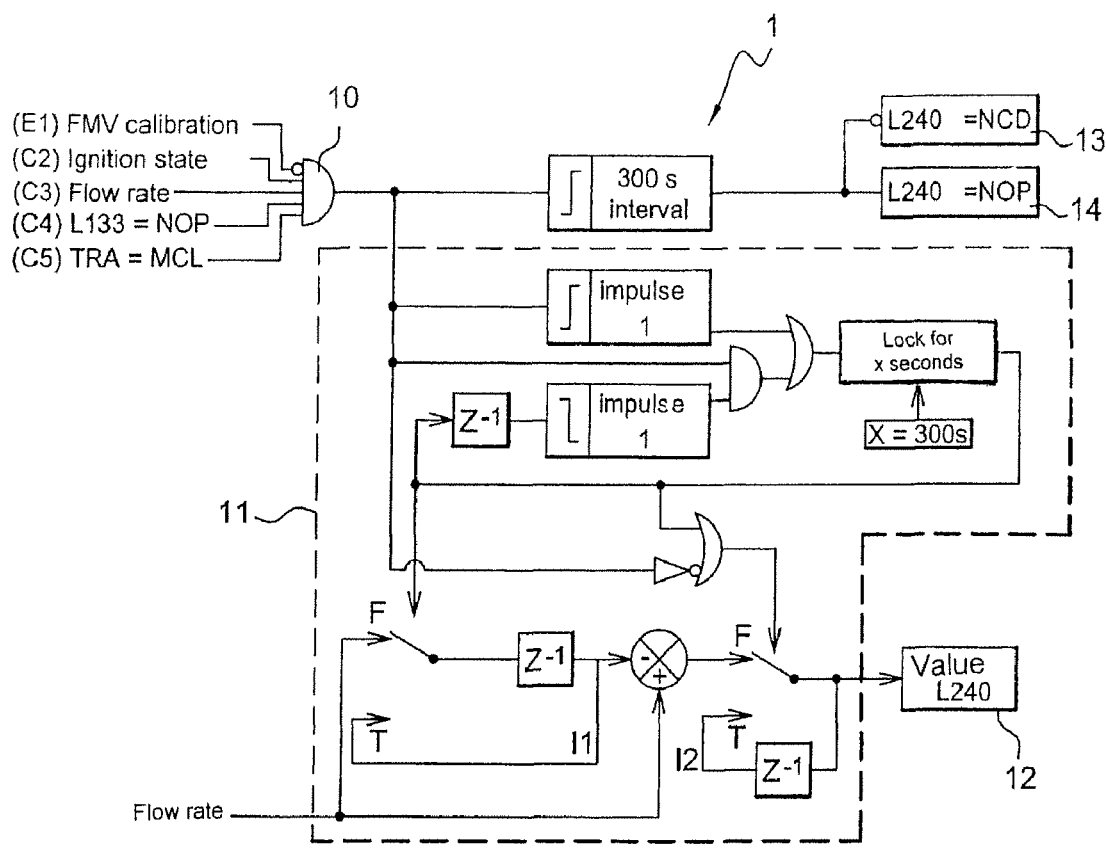
FIG. 1 shows an electronic circuit for determining a fuel consumption coefficient of an engine during a predetermined time interval, in the aircraft computer.

The different electronic circuits of the system of the disclosed embodiments are shown in FIGS. 1 to 5. More specifically, FIG. 1 shows an electronic circuit situated in an engine computer and making it possible to determine the fuel consumption of this engine during a predetermined first time interval. In other words, this circuit of FIG. 1 is used to determine the quantity of fuel used by the engine with which it is associated, during a first time interval. The quantity of fuel used during a first time interval provides the first mode of evaluation of the consumption of an engine. As shall be seen here below, the fuel flow rate of an engine provides another mode of evaluation of the fuel consumption of the engine.

The first predetermined time interval is, for example, a five-minute interval. The size of the interval is chosen especially as a function of the characteristics of the aircraft, the number of engines and the characteristics of these engines. This first time interval is a sliding interval, i.e. the fuel consumption is re-evaluated in real time, in a five-minute window preceding the instant of computation.

The electronic circuit 1 of FIG. 1 is a known circuit, present in most engine computers. It is therefore described here solely to explain the source of certain pieces of data used by the system of the disclosed embodiments.

The quantity of fuel consumed during the first time interval, determined by the circuit of FIG. 1, is called label 240 and is referenced L240. This label 240 is determined for each engine by each engine computer. This label 240 is determined in taking account, during a confirmation time of 300 seconds (i.e. five minutes), of the following criteria:
- (c1) the FMV (fuel metering valve) calibration of the engine: it is ascertained that there is no error of calibration of the FMV, i.e. a check is made to see if the position of the metering unit ensuring the passage of fuel into the engine corresponds to the value of the flowmeter; if this is not the case then there is a calibration error. The motor engine makes constant checks on whether a given position of the FMV truly corresponds to the flow rate value given by the flowmeter. If there is an error of x %, the engine computer indicates a problem of calibration of the FMV.
- (c2) the state of ignition of the engine (a check is made on whether the engine is truly in operation).
- (c3) the information on engine fuel flow rate is valid,
- (c4) the information on the position of the throttle control lever (TRA or throttle resolver angle) is valid
- (c5) the position of the TRA control lever: the control lever can take several positions depending on the engine speed; in the method of the disclosed embodiments a check is made to see whether this control lever is in the MCL position, i.e. the position used for automatic piloting, thus ensuring that all the engines of the aircraft at the same engine speed.

The AND logic gate referenced 10, is used to determine whether all these criteria c1 to c5 are verified. If even only one of these criteria c1 to c5 is not verified, and if this is confirmed during the first time interval (for example 300 seconds), then the label 240 is set at the value NCD, at the step 13, i.e. it is considered to be in non-computable. On the contrary, if all these criteria are fulfilled and confirmed during this first time interval, the label 240 may be determined and, in this case, the parameter L240 is set at the value NOP, the step 14, i.e. it is considered to be computed and valid for the remainder of the computations.

When all these criteria are verified then the circuit 11 does a computation, as a function of the value of the fuel flow rate, of the value L240 at each point in time. This value L240 is obtained at the step 12 and transmitted to the electronic circuit 2 of FIG. 2.

The circuit 2 of the system of the disclosed embodiments provides for verification of the activation of the logic system in the aircraft computer. This verification circuit 2 is aimed at checking to see if all the criteria necessary for the implementation of the method of the disclosed embodiments are verified.

To this end, at the step 21, the circuit 2 receives information on the state of the labels 240 of each engine. In the example described, the aircraft is a four-jet-engine aircraft which therefore has four engines referenced 1, 2, 3 and 4. The reference 21 represents the label 240 at the value NOP for the engine 1, the engine 2, the engine 3 and the engine 4. If none of these labels 240 is invalid then, using a set of logic gates 28 and 26, it is deduced that the leak detection logic system can be activated at the step 27.

At the same time, at the step 22, the circuit 2 receives the state of the labels 244 of each engine. A label 244, referenced L244, corresponds to the fuel flow rate of each of the engines 1, 2, 3 and 4. As explained here above, the fuel flow rate of each engine is a mode of estimation of the consumption of the engine. The fuel flow rate value for each engine is given by the flowmeter of the engine. The fuel consumption of an engine is therefore estimated by the flow rate or by the quantity of fuel consumed, for example in five minutes. As shall be seen in greater detail here below, these two modes of estimation of the fuel consumption are computed in parallel and their use depends on the size of the leak detected. In particular, when the leak is insignificant, the estimation and location of the leak are based on information given by label 240 and if the leak is relatively big, the estimation and location of the leak are based on information given by the label 244.

The circuit 2 therefore receives the label 244 from each engine and, using the set of logic gates 29 and 26, verifies that all the labels 244 are at the value NOP, i.e. that the label 244 can be determined for each engine. As in the case of the label 240, if one of the labels 244 of one of the engines is not valid then the method of the disclosed embodiments is not continued. On the contrary, if all the labels 244 are valid, then the method can be continued by the activation of the leak detection logic system at the step 27.

At the input 23, the circuit 2 receives the value of the altitude of the aircraft. The altitude Z of the aircraft is also a criterion for the continuance of the method at the step 27. It is therefore deemed to be necessary that the altitude should be equal to or greater than a minimum cruising altitude, for example 29,000 feet. Indeed, it frequently happens that when the altitude goes below 29,000 feet, there are differences in flow rate, even if the engines function at the same speed, because of cases of power tapping from the electrical circuits, the hydraulic circuits etc. Thus, below this minimum altitude, the fuel leak detection is disabled in the method of the disclosed embodiments.

At the input 24, the circuit 2 receives the label 346 from each engine. This label 346 corresponds to the speed of the low-pressure compressor of each engine. Indeed, if the low-pressure compressors are at idling speed, it means that the aircraft is descending. Hence, if the low-pressure compressors are idling and if the altitude of the aircraft is below an altitude Z for example equal to 29,000 feet, this confirms the fact that the aircraft is descending. And if this is confirmed during a time 25, equal for example to 600 seconds, then using a set of logic gates 20 and 26, it is deduced from this that the leak detection logic system cannot be activated at the step 27.

Figure 2:
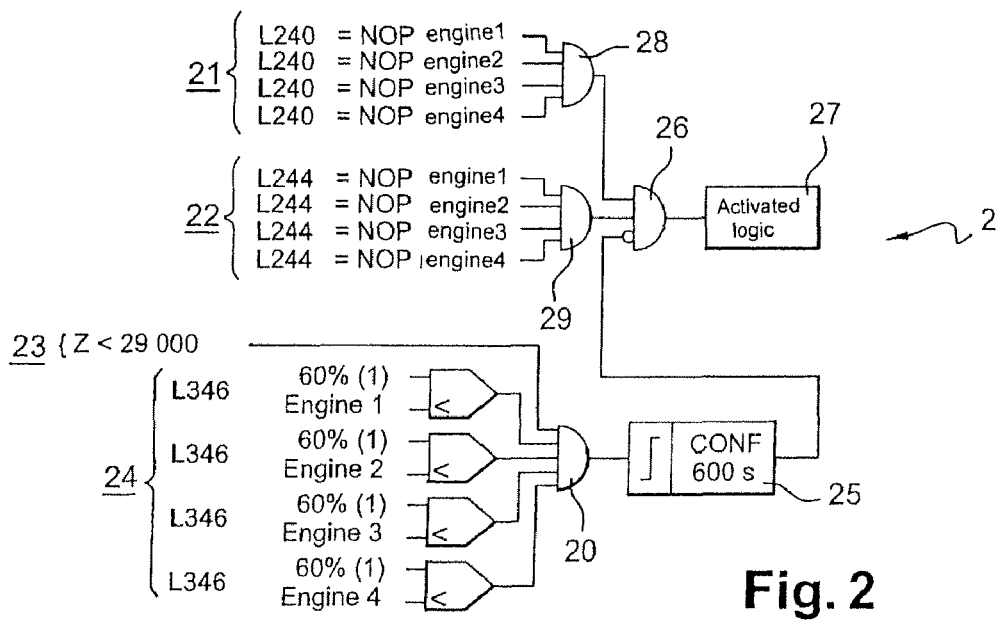
FIG. 2 shows an electronic circuit for checking flight conditions for the implementation of the method of the disclosed embodiments, in the aircraft computer.

The circuit 2 of FIG. 2 therefore makes it possible, when the logic system is activated at 27, to ensure that the method will take account of comparable fuel consumption values since, in principle, they are equal if the operation of all the engines is normal. It must be noted however that, as with any engine, there may be variations in consumption from one engine to another depending on the age of the engine, uncertainties due to mechanics, standards of development of the engine, power taps (hydraulic circuits, electrical circuits and air) etc. These variations, unrelated to leakage, are relatively low, in the range of 15% to 20%.

Figure 3:
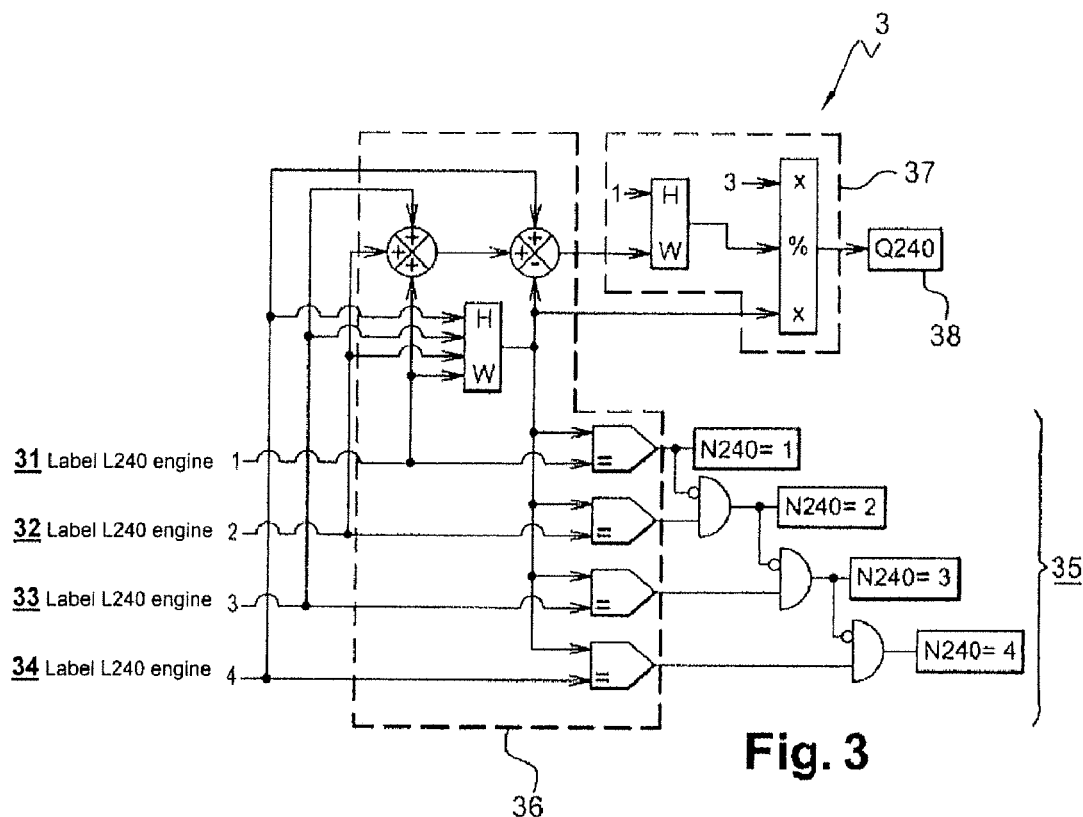
FIG. 3 shows the electronic circuit for detecting the consumption coefficient of the engine having the highest consumption.
Figure 4:
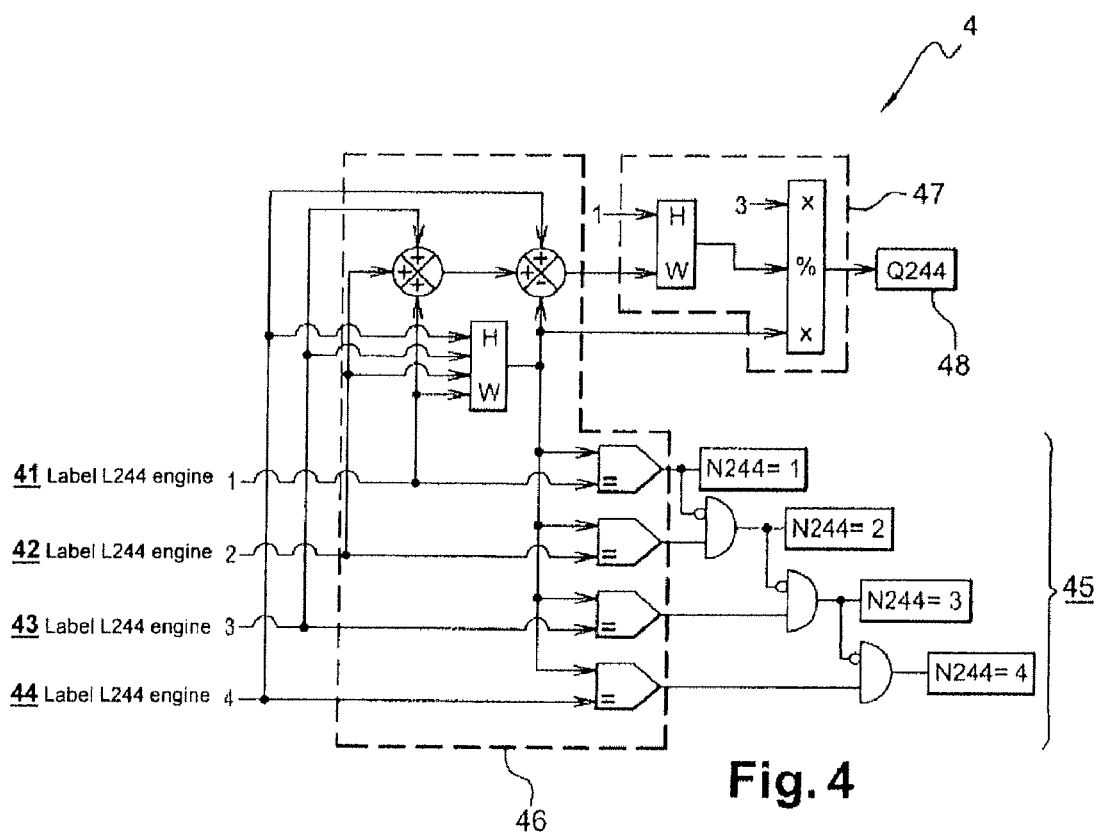
FIG. 4 shows the electronic circuit for determining the fuel flow rate coefficient for the engine having the highest fuel flow rate.

When the leak detection logic system is activated at the step 27, the method is continued in the circuits 3 and 4 of the respective FIGS. 3 and 4.

FIG. 3 shows an electronic circuit 3 for determining the consumption surplus coefficient for the engine having the greatest fuel consumption. This circuit 3 receives the values of the labels 240 of the engines, respectively 1, 2, 3 and 4, at the inputs 31, 32, 33 and 34. In other words, at the input 31, this circuit 3 receives the quantity of fuel used in five minutes by the engine 1, at the input 32 it receives the quantity of fuel used in five minutes by the engine 2, etc. A set of logic elements 36 is used to compare the value of the label 240 of each engine with the value of the label 240 of the other engines. Thus, the highest label 240 value is determined and, consequently, the engine having the greatest consumption from the viewpoint of the quantity of fuel used in five minutes is determined. When this engine has been determined, a message can be displayed on a screen of the aircraft cockpit. This message, referenced 35, gives the number of the engine having the greatest label 240. For example, if it is the engine number 4 that has the greatest label 240, then the information 35 is N240=4.

The result of this comparison is also used, in the step 37, to determine the consumption surplus coefficient also called consumption surplus ratio and referenced Q240. This consumption surplus coefficient Q240 corresponds to the value obtained by dividing the value of the label 240 of the engine having the greatest label 240 by the average of the other labels 240. For example, if the engines 1, 2 and 3 have a label 240 equal to 200, and if the engine 4 has a label 240 equal to 400, then the coefficient Q240 is equal to 200%, which means that the label 240 of the engine 4 is twice as great as the label 240 of the engines 1, 2 and 3 on an average. The value of this coefficient Q240 is obtained at the step 38 and then transmitted to the alarm triggering circuit 5.

In parallel with the computation of the coefficient Q240, a coefficient Q244 is determined by the electronic circuit 4 for determining the consumption surplus coefficient of FIG. 4. This circuit 4 receives the values of the labels 244 of the engines, respectively 1, 2, 3 and 4, at the inputs 41, 42, 43 and 44. In other words, at the input 41, this circuit 4 receives the fuel flow rate for the engine 1, at the input 42 it receives the fuel flow rate for the engine 2, etc. A set of logic elements 46 is used to compare the value of the label 244 of each engine with the value of the label 244 of the other engines. Thus, the highest label 244 value is determined and, consequently, the engine having the highest fuel flow rate is determined. When this engine has been determined, a message can be displayed on a screen of the aircraft cockpit. This message, referenced 45, gives the number of the engine having the greatest label 244. For example, if it is the engine number 4 that has the greatest label 244, then the information 45 is N244=4.

The result of this comparison is also used, in the step 47, to determine the consumption surplus coefficient in terms of fuel flow rate referenced Q244. This consumption surplus coefficient Q244 corresponds to the value obtained by dividing the value of the label 244 of the engine having the greatest label 244 by the average of the other labels 244. The value of this coefficient Q244 is obtained at the step 48 and then transmitted to the alarm triggering circuit 5.

The circuits 3 and 4 are identical except that they take account of the different fuel consumption values, i.e. for the circuit 4, the fuel flow rate directly measured by the flowmeter of each engine 1, 2, 3, 4 and, for the circuit 3, the quantity of fuel used during a first time interval by the engines 1, 2, 3 and 4.

Figure 5:
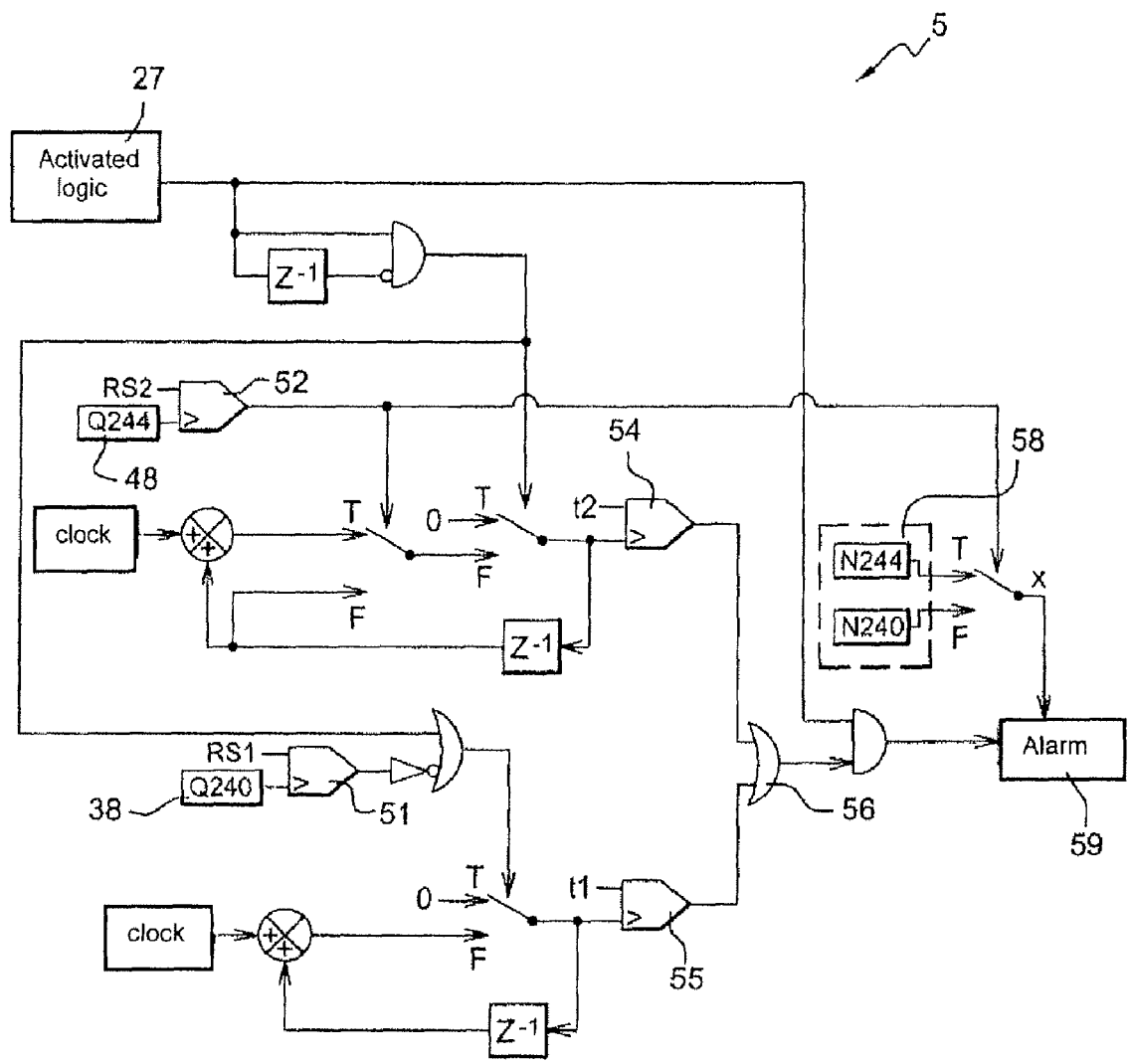
FIG. 5 shows the electronic circuit for triggering an alarm using the coefficients of the consumption coefficients determined in the circuits of FIGS. 3 and 4.

FIG. 5 shows the alarm triggering electronic circuit 5. This electronic circuit 5 takes account of the results of the circuits 2, 3 and 4. More specifically, the circuit 5 receives the following information at input:

input 27: it receives a piece of data confirming that the detection logic system can be activated;

input 38: it receives the value of the consumption surplus coefficient Q240;

input 48: it receives the value of the consumption surplus coefficient Q244.

The coefficient Q240 received at the input 38 is compared by a comparator 51 with a threshold coefficient value or threshold ratio RS1 from which there is considered to be a leak. For example, this threshold ratio may be 1.25, which means that, from a coefficient Q240 of 25% onwards, there is considered to be a leak and an alarm must be raised. If the coefficient Q 240 is greater then 1.25 then, in the step 55, the method verifies that this information remains valid during a confirmation period t1. This confirmation period t1 may be variable, depending on the percentage of the coefficient Q240. For example, it may be 88 minutes if the percentage is between 25% and 50% and 60 minutes if the percentage is between 51% and 80%. Preferably, the confirmation time is at least 2.5 times the first time interval of the label 240 (i.e. five minutes) so that the confirmation is made for at least two labels 240.

At the same time, the coefficient Q244 received at the input 48 is compared, by the comparator 52, with a threshold ratio value RS2 greater than threshold value RS1. For example, this threshold ratio RS2 may be equal to 4. This means that if the fuel flow rate of the engine considered is 4 times greater than the mean flow rate of the other engines, then there is considered to be a leak and an alarm must be raised. If the coefficient Q244 is greater than 4 then, in the step 54, the method checks whether this information remains valid for a certain confirmation period t2. For the coefficient Q244, this confirmation period t2 is preferably fixed, for example as being equal to four minutes.

The outputs of these verification steps 55 and 54 are connected to an OR logic gate 56. As soon as a piece of data pertaining to the presence of a leak is received from the OR gate, and if the leak detection logic system is activated (step 27), then an alarm signal can be sent out at the step 59. On the contrary, if it is determined in the step 27 that the detection logic system should not be activated, then the alarm is not triggered.

The method of the disclosed embodiments proposes to take account of either the coefficient Q244 corresponding to the fuel flow rate or the coefficient Q240 corresponding to the quantity of fuel used during a certain time interval. When the leaks are massive, for example of the order of 3 to 5 tons of fuel in less than an hour, there is no need to smooth out possible differences in fuel over a lengthy flight time. It is also useful to determine the quantity of leakage directly from the flow rate because, in this case, the detection can be done in less then one hour of flight.

In the method of the disclosed embodiments, it is considered that starting from a certain percentage of the difference in fuel consumption between the engine considered and the average for the other engines, the flow rate can be taken into account directly instead of the quantity of fuel used in a certain time interval. Indeed, below a certain percentage of consumption surplus, for example of the order of 20% to 30%, the loss suffered is too small to be computed directly from the flow rate. As explained here above, certain external criteria have an influence on the fuel flow rate, thus giving the coefficient Q244 low reliability, when the leaks are small. On the contrary, the coefficient Q240 is highly reliable since it is computed over a certain time interval, with smoothing of differences by accumulation of a certain quantity of fuel before comparison. This is why the method of the disclosed embodiments uses the label 240 which is regularly refreshed.

The invention claimed is:

1. A method for the detection and locating of a fuel leak in an engine of an aircraft of the multi-engine type, comprising:
   (a) determining a fuel consumption for each engine of the aircraft,
   (b) comparing the consumption of each engine with the consumption of the other engines of the aircraft,
   (c) detecting the engine having the greatest fuel consumption,
   (d) determining a consumption surplus ratio of this engine relative to the other engines,
   (e) verifying whether the surplus consumption comes from a leak, and
   (f) upon verification, triggering an alarm.

2. Method according to claim 1, wherein the fuel consumption for each engine is a quantity of fuel used in a first predefined time interval.

3. Method according to claim 2, wherein the first time interval is a sliding interval.

4. Method according to claim 1, wherein the fuel consumption is the fuel flow rate for each engine.

5. Method according to claim 1, wherein the operation of checking the consumption surplus comprises:
   comparing the value of the surplus ratio with a predefined threshold value of the surplus ratio, and
   confirming whether the value of the surplus ratio is maintained during a second predefined time interval.

6. Method according to claim 5, wherein the second time interval develops inversely proportionally to the value of the surplus ratio.

7. Method according to claim 2, wherein the operations (a) to (e) are performed simultaneously for a quantity of fuel used during the first time interval and for a fuel flow rate.

8. Method according to claim 7, wherein the operation (f) is triggered if the consumption surplus is detected either through the quantity of fuel or through the fuel flow rate.

9. Method according to claim 7, wherein the threshold value of the ratio for the fuel flow rate is greater than the threshold value of the ratio for the quantity of fuel.

10. Method according to claim 1, comprising an operation to locate the leak with a determining of the engine affected by the leak.

11. Method according to claim 1 wherein the alarm is triggered only if certain criteria pertaining to the flight conditions are fulfilled.

12. Method according to claim 1, wherein the operations (a) and (b) after performed only if the engines work at the same speed.

13. Method according to claim 11, wherein the criterion is that the aircraft flies at a minimum altitude.

14. Method according to claim 11, wherein the criterion is that the engines work above a minimum speed.

15. System of detection and location of a fuel leak in an engine of a multi-engine type aircraft, wherein the system implements the method according to claim 1.

16. System according to claim 15, installed in an aircraft computer and connected, for each engine, to an engine computer in order to receive data on the conditions of operation of the aircraft and of each engine.

17. System according to claim 15, comprising logic circuits capable of processing data received from the engine computers and from the aircraft computer.

18. System according to claim 15, comprising:
a verification circuit for checking flight conditions,
at least one circuit for the detection of the consumption surplus ratio, and
a circuit for triggering an alarm.

19. A multi-engine aircraft comprising a system according to claim 15.

* * * * *